(12) United States Patent
Kursawe et al.

(10) Patent No.: US 10,532,293 B2
(45) Date of Patent: Jan. 14, 2020

(54) PROCESSING UNIT FOR A WASHING MEDIUM CONTAMINATED WITH SULPHUR OXIDES AND/OR NITROGEN OXIDES

(71) Applicant: Siemens Aktiengesellschaft, Munich (DE)

(72) Inventors: Ansgar Kursawe, Niedernhausen (DE); Stefan Hauke, Einhausen (DE); Ralph Joh, Seligenstadt (DE); Markus Kinzl, Dietzenbach (DE); Rüdiger Schneider, Eppstein (DE)

(73) Assignee: Siemens Aktiengesellschaft, Munich (DE)

( * ) Notice: Subject to any disclaimer, the term of this patent is extended or adjusted under 35 U.S.C. 154(b) by 342 days.

(21) Appl. No.: 15/304,599

(22) PCT Filed: Mar. 25, 2015

(86) PCT No.: PCT/EP2015/056359
§ 371 (c)(1),
(2) Date: Oct. 17, 2016

(87) PCT Pub. No.: WO2015/161977
PCT Pub. Date: Oct. 29, 2015

(65) Prior Publication Data
US 2017/0043275 A1    Feb. 16, 2017

(30) Foreign Application Priority Data
Apr. 25, 2014    (DE) .................. 10 2014 207 848

(51) Int. Cl.
*B01D 19/00*    (2006.01)
*B01D 9/00*    (2006.01)
*B01D 53/14*    (2006.01)

(52) U.S. Cl.
CPC ........... *B01D 9/0031* (2013.01); *B01D 9/004* (2013.01); *B01D 9/0059* (2013.01);
(Continued)

(58) Field of Classification Search
None
See application file for complete search history.

(56) References Cited

U.S. PATENT DOCUMENTS 3,208,834 A    9/1965 Schulze
3,959,139 A *  5/1976 El-Hindi ................ B04C 7/00
                                                  210/97

(Continued)

FOREIGN PATENT DOCUMENTS

EP    2409755 A1    1/2012
EP    2653209 A1    10/2013

(Continued)

OTHER PUBLICATIONS

DE Search Report dated Jan. 8, 2015, for DE application No. 102014207848.2.

(Continued)

*Primary Examiner* — Amber R Orlando
*Assistant Examiner* — Phillip Y Shao
(74) *Attorney, Agent, or Firm* — Beusse Wolter Sanks & Maire (57)  ABSTRACT

A processing unit for a liquid washing medium contaminated with sulphur oxides and/or nitrogen oxides, has an evaporation stage for concentrating the active components of the washing medium by an evaporator and/or by a heat exchanger, and has a collecting tank connected to the evaporator and/or to the heat exchanger. The collecting tank is configured as a crystallizer for removing sulfur oxides from the washing medium by crystallization of a sulphate, in particular of potassium sulphate. A separating device for (Continued)

carbon dioxide has a corresponding processing unit, and a method for processing a washing medium contaminated with sulphur oxides and/or nitrogen oxides uses a corresponding processing unit.

27 Claims, 3 Drawing Sheets

(52) U.S. Cl.
CPC ..... *B01D 53/1425* (2013.01); *B01D 53/1475* (2013.01); *B01D 2009/0086* (2013.01); *B01D 2252/20494* (2013.01)

(56) References Cited

U.S. PATENT DOCUMENTS

| | | | |
|---|---|---|---|
| 4,389,383 A | 6/1983 | Sokolik, Jr. et al. | |
| 4,847,062 A * | 7/1989 | Rogers | C01C 3/10 423/379 |
| 7,056,356 B2 * | 6/2006 | Allen | B01D 9/0022 23/295 R |
| 2013/0214202 A1 | 8/2013 | Forbert et al. | |
| 2015/0034867 A1 * | 2/2015 | Giling | B01D 53/62 252/190 |
| 2015/0075376 A1 | 3/2015 | Forbert et al. | |

FOREIGN PATENT DOCUMENTS

| | | |
|---|---|---|
| WO | 2012062724 A2 | 5/2012 |
| WO | 2013156300 A1 | 10/2013 |

OTHER PUBLICATIONS

IPRP (PCT/IPEA/416) dated Jul. 1, 2016, for PCT application No. PCT/EP2015/056359.

International Search Report dated Aug. 31, 2015, for PCT application No. PCT/EP2015/056359.

* cited by examiner

PROCESSING UNIT FOR A WASHING MEDIUM CONTAMINATED WITH SULPHUR OXIDES AND/OR NITROGEN OXIDES

CROSS REFERENCE TO RELATED APPLICATIONS

This application is the US National Stage of International Application No. PCT/EP2015/056359 filed Mar. 25, 2015, and claims the benefit thereof. The International Application claims the benefit of German Application No. DE 102014207848.2 filed Apr. 25, 2014. All of the applications are incorporated by reference herein in their entirety.

FIELD OF INVENTION

The invention relates to a processing unit for a scrubbing medium contaminated with sulfur oxides and/or nitrogen oxides. The invention additionally relates to a separation device having a corresponding processing unit, and to a method for processing a scrubbing medium contaminated with sulfur oxides and/or nitrogen oxides.

BACKGROUND OF INVENTION

Against the background of climatic changes, it is a global aim to decrease the emission of pollutants into the atmosphere. This applies in particular to the emission of carbon dioxide ($CO_2$), which accumulates in the atmosphere, impedes heat emission from the earth and thus, as a greenhouse effect, leads to an increase in the surface temperature of the earth.

Particularly in the case of fossil-fueled power plants for generating electrical energy or heat, a carbon dioxide containing flue gas is formed by the combustion of a fossil fuel. To avoid or decrease carbon dioxide emissions into the atmosphere, the carbon dioxide must be separated off from the flue gas. Correspondingly, in particular in the case of existing fossil-fueled power plants, suitable measures are being discussed in order to separate off the resultant carbon dioxide from the flue gas after the combustion (Post-Combustion-Capture). As a technical implementation, for this purpose, the carbon dioxide present in the flue gas is scrubbed out of the respective flue gas stream by an absorption-desorption process by means of a scrubbing medium, or of an absorption medium.

In addition to carbon dioxide, other acid gases, in particular nitrogen oxides ($NO_x$) and/or sulfur oxides ($SO_x$) are also absorbed in such, in particular, amine-containing and alkaline scrubbing media. In contrast to carbon dioxide, $SO_x$, for example, forms with an alkaline scrubbing medium, inter alia, temperature-stable salts, such as, for example, sulfate. Thus, when a potassium-containing scrubbing medium is used, $SO_x$ precipitates out together with potassium as potassium sulfate ($K_2SO_4$), that can no longer be re-formed in a desorption unit. Owing to the change in alkali metal concentration caused thereby, these temperature-stable salts successively lower the capacity of the scrubbing medium for absorbing carbon dioxide. $NO_x$ is absorbed by the scrubbing medium, disproportionates in the solution and there forms nitrosamines, and also other soluble breakdown products.

In order to remove said contaminants, a two-stage processing of the scrubbing medium is customary. For this purpose what is termed a reclaimer is used with an $SO_x$ reclaiming stage for removing $SO_x$ or sulfates, and also with an $NO_x$ reclaiming stage for removing $NO_x$, nitrite, nitrate and corresponding secondary products.

In the $SO_x$ reclaiming stage, that is to say the $SO_x$ reclaimer, potassium sulfate, for example, is separated out in crystalline form, on an industrial scale preferably by cooling crystallization. The soluble components are recirculated to the carbon dioxide separation process, and the potassium sulfate that is separated off is fed to a further use, for example as fertilizer additive or as feed stock for special chemical production. The $NO_x$ reclaiming stage, that is to say the $NO_x$ reclaimer, serves for recovering the active component of the scrubbing medium, that is to say, for example, an amino acid salt. For this purpose, the scrubbing medium is concentrated in an evaporation stage and from there is pumped into a crystallizer of the $NO_x$ reclaimer. Here, the amino acid salt is crystallized out as a solid. Soluble minor components are separated off as waste matter and fed to a corresponding disposal.

However, the use of the $SO_x$ reclaimer and the $NO_x$ reclaimer is not equally economical in every power plant type. Since the flue gases emitted by power plants differ greatly in their composition, in particular depending on the fuel used, according to the power plant type, different reclaiming stages are "dominant". In coal power plants, even after a desulfurization of the flue gas, typically very high sulfur amounts are still present in the scrubbing medium, in such a manner that, for example, potassium sulfate can be separated out in crystalline form and subsequently sold. Correspondingly, the use of an $SO_x$ reclaimer, based, in particular, on a cooling crystallization, is economic in a coal power plant.

In gas power plants, the situation is somewhat different: the input sulfur amounts are markedly lower than in the case of coal power plants, in such a manner that the profits from the sale of crystallized potassium sulfate are negligible in comparison with the operating costs of an $SO_x$ reclaimer. In other words, the use of an $SO_x$ reclaimer is uneconomic in gas power plant applications.

SUMMARY OF INVENTION

Accordingly, a first problem addressed by the invention is to specify a processing unit which is improved from economic aspects in comparison with the prior art and by means of which a scrubbing medium can be effectively freed from contaminants that are present.

A second problem addressed by the invention is to specify a carbon dioxide separation device having a correspondingly improved processing unit.

A third problem addressed by the invention is to specify a method which may be carried out economically using the improvements.

The first problem of the invention is solved according to the invention by a processing unit, comprising an evaporation stage for concentrating the active component of the scrubbing medium having an evaporator and/or having a heat exchanger, and also having a collecting tank that is connected to the evaporator and/or to the heat exchanger, characterized in that the collecting tank is constructed as a crystallizer for removing sulfur oxides from the scrubbing medium by crystallization of a sulfate, in particular potassium sulfate.

In a first step, the invention proceeds from the previously described fact that the use of an $SO_x$ reclaimer based on cooling crystallization in gas power plant applications is uneconomic for processing scrubbing medium. The amounts of sulfur introduced via the flue gas are so low that the profits from sale of the potassium sulfate in comparison to the operating costs of an $SO_x$ reclaimer are negligible.

In a second step, the invention takes into account the fact that even with low amounts of sulfur oxides in the scrubbing medium it is necessary to remove these safely. Via the sulfate formed from the sulfur oxides, and in particular via potassium sulfate, there is the risk that, in the evaporator of the $NO_x$ reclaimer, uncontrolled crystallization and corresponding process-damaging incrustations occur.

In the evaporator of the $NO_x$ reclaimer in which the scrubbing medium that is fed is concentrated to the necessary level for crystallization of the amino acid salt, the solubility of the sulfate, in particular of potassium sulfate, does fundamentally increase owing to the elevated temperature necessary for the evaporation. However, within the evaporator, the solubility falls, in particular of the potassium sulfate, disproportionately with decreasing water fraction, that is to say with increasing amino acid salt concentration. An unwanted crystallization of sulfate can thus not be excluded.

Therefore, to avoid unwanted concentration of sulfate in the scrubbing medium over the operating time of the processing operation, it is absolutely necessary to ensure the depletion of sulfur from the scrubbing medium. The $SO_x$ reclaiming process is therefore fundamentally indispensable even in gas power plant applications.

Taking into account this set of problems, the invention recognizes in a third step that it is possible to implement the desired processing and/or regeneration of a scrubbing medium in an inexpensive and simple manner if a processing unit is used in which a customary $NO_x$ reclaimer is modified in such a manner that, in addition to separating off the active component from the scrubbing medium, it likewise permits the required depletion of sulfur.

For this purpose, a collecting tank is connected to the evaporator and/or the heat exchanger of the evaporation stage, which collecting tank is constructed as a crystallizer for removing sulfur oxides from the scrubbing medium by crystallization of a sulfate, and in particular by crystallization of potassium sulfate. Thus a collecting tank used in the $NO_x$ reclaiming process as a part of an evaporation stage is modified in such a manner that it meets the desired function for removing sulfate, and in particular for removing potassium sulfate.

The processing unit, in this way, combines the functions of a customary $SO_x$ reclaimer and a customary $NO_x$ reclaimer in such a manner that it is suitable, in particular, for gas power plant applications having low sulfur loads. A function of a classical $SO_x$ reclaimer at least necessary for depleting the sulfur from the main process, namely the controlled crystallization of sulfur oxides present in the scrubbing medium, for example in the form of potassium sulfate, is transferred to the markedly less complex and less expensive combined processing unit.

In other words, as a result of the collecting tank constructed as a crystallizer, the key component of a customary $SO_x$ reclaimer is integrated into an $NO_x$ reclaimer, in such a manner that an $SO_x$ reclaimer can be dispensed with as a separate subsystem.

By combining an evaporator and/or heat exchanger customarily used in the $NO_x$ reclaiming process with a collecting tank constructed as a crystallizer, a fully-fledged evaporation crystallizer is provided which permits a controlled crystallization of the sulfate out of the scrubbing medium. By displacing the crystallization to the collecting tank of the evaporation crystallizer, the evaporator is protected against growth of coating and/or the encrustations and probability of occurrence thereof are considerably reduced.

An evaporator used in the evaporation stage can be constructed, for example, as a falling-film evaporator or as a thin-film evaporator. Proceeding from the evaporator, the scrubbing medium thickened or concentrated therein is passed to the collecting tank. The thickening proceeds by concentration of the active component of the scrubbing medium, for which purpose water is expelled from the scrubbing medium within the evaporator.

If a heat exchanger is used in the evaporation stage, the particle-loaded scrubbing medium in particular is heated therein. The heated scrubbing medium is then likewise passed to the collecting tank for separating off the particles. Overall, via an evaporation stage having a heat exchanger and a collecting tank, the operation of heating the scrubbing medium and evaporating the scrubbing medium for thickening and/or for concentration of the scrubbing medium may be separated from one another.

As a combination of a heat exchanger with a corresponding collecting tank, for example Oslo crystallizers, draft tube crystallizers or FC (forced circulation) crystallizers are known.

In an FC crystallizer, which acts as a circulation crystallizer, a substream, that is to say suspension of potassium sulfate in the scrubbing medium, is withdrawn from the collecting tank and pumped through the heating tubes of the heat exchanger. The suspension heated in the heat exchanger is then recirculated back to the collecting tank. Owing to a reduced pressure in the collecting tank, water vaporizes at the interface of the collecting tank. The water vapor is taken off, as a result of which a supersaturation forms in the collecting tank, and particles crystallize out. The particles that have crystallized out can be taken off as a product stream and fed to a reclamation.

In the processing unit, in particular sulfates can be separated off from alkali metals. By using potassium-containing scrubbing media, however, in particular the crystallization of potassium sulfate from the scrubbing medium is possible, and desired.

In order to safeguard the crystallizer function of the collecting tank, it is expedient, in particular, that the collecting tank is dimensioned so as to be larger compared with the collecting tanks used in customary $NO_x$ reclaimers. To mix the scrubbing medium and/or the suspension of scrubbing medium and crystallized sulfate particles, the collecting tank is equipped with a corresponding agitator. Alternatively, pumped circulation is also possible for mixing.

The feed of the scrubbing medium that is to be processed into the collecting tank expediently proceeds by coupling thereof with a desorber unit of a separation device, proceeding from which a sulfate-rich input stream of scrubbing medium is fed to the processing unit.

In an advantageous embodiment of the invention, the collecting tank comprises a crystallization chamber for formation of the sulfate particles. Advantageously, in the collecting tank, a classifying appliance for separating the crystallized sulfate particles according to the particle size thereof is also included. The crystallized particles in this case are, in particular, potassium sulfate particles. The crystallization chamber in which, in particular, the potassium sulfate particles are formed, consists in this case advantageously of a substantially cylindrical tank in which the scrubbing medium and the growing sulfate particles are situated. In the classifying appliance, the separation of the formed sulfate particles proceeds according to the particle size thereof. In this case, the large sulfate particles are separated off as far as possible from the medium and small sulfate particles.

In a further embodiment of the invention, the classifying appliance for separating the sulfate particles according to the particle size thereof is constructed in the form of a classifying zone having a first classifying region and a second classifying region within the crystallizer. These are thus internal classifying zones which are expediently provided in the boundary region of the crystallizer. In this case the classifying zone is advantageously constructed as a concentric calming zone in which, for example, what are termed calming baffles are used. The collecting tank and the evaporator therefore represent an evaporator crystallizer having internal classifying function.

Further, the collecting tank is connected to a separation unit. The separation unit serves for the solid-liquid separation of a suspension taken off from the collecting tank and/or the crystallizer. The scrubbing medium conducted to date for separating off the pure active component directly from evaporator and/or the attached collecting tank of the $NO_x$ reclaimer to the crystallizer of the $SO_x$ reclaiming process is therefore first purified from crystallized sulfate in the context of a solid-liquid separation in the separation unit. The overflow of the separation unit formed in this case is a low-particle clear run which can then be further used in different ways.

The resultant underflow of the separation unit contains the sulfate particles separated off in the course of the solid-liquid separation. In order to be able to use the sulfate particles present in the underflow as crystal nuclei in the collecting tank, a further outlet of the separation unit is expediently connected to an inlet of the collecting tank.

In principle, for the solid-liquid separation in the separation unit, various apparatuses can be used that permit the desired separation from scrubbing medium of sulfate particles still present in the suspension fed to the separation unit. It is advantageous if the separation unit is constructed as a hydrocyclone. A hydrocyclone is a centrifugal force separator for liquid mixtures in which solid particles present in a suspension are separated off or classified. In the course of the solid-liquid separation, in this case the particles are deposited on the wall of the cyclone and discharged by the underflow, whereas the substantially particle-free fraction escapes via an overflow.

Advantageously, in the case of a classification appliance, the suspension that is taken off from the first classifying region of the collecting vessel is fed to the separation unit that comprises substantially only sulfate particles of medium and small size.

Expediently, an outlet of the separation unit is connected to an additional crystallizer for recovery of the active component of the scrubbing medium. The separation unit is therefore flow-connected between the collecting tank constructed as a crystallizer and the crystallizer of the $NO_x$ reclaimer, in such a manner that the transfer of a first low-sulfate and low-particle substream can proceed from the separation unit to the crystallizer of the $NO_x$ reclaimer. The first substream in this case is expediently a substream of the overflow of the separation unit.

The processing of the crystallizer with recovery of the active component present in the scrubbing medium, that is to say, for example a potassium amino acid salt, proceeds by the addition of carbon dioxide and the associated lowering of the pH of the scrubbing medium with simultaneous cooling. As a result, the active component is precipitated out and can finally be recirculated back to the process. The further minor components and breakdown products such as, in particular, also nitrites and nitrates, and also degradation products, are removed from the process in dissolved form as a waste stream and can then be fed to a waste reclamation.

It is particularly advantageous when an outlet of the separation unit is connected to an inlet of the evaporator. A second substream of the overflow of the separation unit, the main steam, in this case passes as is customary to date into the evaporator, in order there to eject water for the purpose of concentrating the active component of the scrubbing medium and the associated concentration of the scrubbing medium.

In a further embodiment, the collecting tank is connected via an outlet to an inlet of the collecting tank. Such an embodiment is in particular advantageous when the evaporation stage comprises a heat exchanger to which the collecting tank is connected. The heat exchanger is expediently connected between the outlet of the collecting tank and the inlet of the collecting tank in such a manner that the scrubbing medium that is withdrawn can be conducted in a circuit via the heat exchanger. Heating the scrubbing medium proceeds within the heat exchanger of the evaporation stage, the evaporation of water and the resultant supersaturation of the scrubbing medium proceed within the collecting tank of the evaporation stage.

Expediently, an outlet of the separation unit is connected to an inlet of the collecting tank. Via this connection, a substream of the overflow that is withdrawn from the separation unit, advantageously the main stream, is recirculated via this connection to the collecting tank. Such a connection is expedient if a heat exchanger connected to the collecting tank in the evaporation stage is used.

In a further advantageous embodiment, an outlet of the separation unit is connected to an inlet of an absorber unit of a carbon dioxide separation device. In this manner a third substream of the overflow of the separation unit can be recirculated back to the process for separation of carbon dioxide from a flue gas. Such a recirculation is in particular advantageous if, for the ejection of the sulfate, more scrubbing medium must be treated that would be economically necessary for the regeneration of the scrubbing medium associated with losses of the scrubbing medium.

In a further advantageous embodiment, a metering device for adjusting an alkali metal concentration, in particular a potassium concentration, in the scrubbing medium is connected to the collecting tank. By means of the metering device it is possible to keep the alkali metal balance and/or potassium balance in the process constant. This can proceed, for example, by the feed or withdrawal of potassium from the process. A feed of potassium in this case is rather to be expected in the case of sulfur-rich flue gases of coal-fired power plant applications in which the $SO_x$ reclaimer is dominant. In very low sulfur processes such as, typically, in the case of gas-fueled power plant applications, in which the $NO_x$ reclaimer dominates, potassium can concentrate, which must then be removed from the process.

Expediently, the second classifying region is coupled via an outlet of the collecting tank to a reclamation appliance for the precipitated sulfate, in particular for potassium sulfate. In a crystallization and classification of the sulfate particles according to the size thereof, in this manner a suspension can be withdrawn from the second classification region which is advantageously situated at the bottom of the collecting tank. For this purpose, expediently, a pump constructed as a sump pump is used that ejects the crystallized sulfate from the process. The suspension ejected in this case typically has a potassium sulfate fraction between 3% by weight and 10% by weight, that accumulates in a collecting tank of the reclamation appliance. The solid fraction can in this case be adjusted via the ratio of the discharge rate of the sump pump to the discharge rate of the pumps for the low-particle starting stream fed to the crystallizer of the $NO_x$ reclaimer and the main process.

In particular the potassium sulfate particles can be separated off from the suspension that is withdrawn from the collecting tank and/or from the crystallizer by a solid-liquid separation, further processed and finally used for storage or further use, for example as fertilizer. As separation apparatus for solid-liquid separation, for example a filter, a decanter or a centrifuge can be used.

On account of its good absorption capacity, the active component of the scrubbing medium used is expediently an amino acid salt, in particular a potassium-containing amino acid salt.

The second problem of the invention is solved according to the invention by a carbon dioxide separation device, comprising an absorber unit for separating off carbon dioxide from a flue gas by means of a scrubbing medium, and also a desorber unit that is flow-connected downstream of the absorber unit and is for separating off the carbon dioxide from the scrubbing medium, characterized in that an above-described processing unit is flow-connected downstream of the desorber unit.

The absorber unit and the desorber unit are flow-connected with one another via pipes in which the carbon dioxide-loaded scrubbing medium and the correspondingly regenerated scrubbing medium circulate. During the separation process, by means of the separation device carbon dioxide present in the flue gas is, by means of the scrubbing medium, scrubbed out of the crude gas. The scrubbing medium is fed for regeneration to the processing unit in which not only nitrogen oxides but also sulfur oxides, and also the secondary products thereof can be removed in a shared reclaiming process.

The advantages stated for the above-described separation unit and the advantageous implementations thereof can be applied analogously to the separation device.

The third problem of the invention is solved according to the invention by a method for processing a scrubbing medium contaminated with sulfur oxides and/or nitrogen oxides, wherein the scrubbing medium, to concentrate an active component thereof, is fed to an evaporation stage having an evaporator and/or having a heat exchanger, and also having a collecting tank that is flow-connected to the evaporator and/or to the heat exchanger, characterized in that sulfur oxides present in the scrubbing medium are crystallized out in the collecting tank as sulfate particles, in particular as potassium sulfate particles.

In other words, the collecting tank is constructed as a crystallizer in which the sulfur oxides present in the scrubbing medium are crystallized as sulfate particles, in particular as potassium sulfate particles.

In an advantageous embodiment of the invention, the sulfate particles are formed in a crystallization chamber of the collecting tank. Further, the sulfate particles are separated in a classifying appliance of the collecting tank according to their particle size. During the classification which advantageously proceeds in an integrated classifying zone in the rim region of the crystallizer, the large sulfate particles, in particular the large potassium sulfate particles, are separated as far as possible from the medium and small potassium sulfate particles.

Advantageously, the sulfate particles are fed from the collecting tank to a separation unit. Advantageously, in the case of a classifying appliance, a first substream having substantially small and medium sulfate particles, in particular having substantially small and medium potassium sulfate particles, is fed from the collecting tank to the separation unit. In the separation unit, the sulfate particles still present in the scrubbing medium are separated off from the scrubbing medium. Said sulfate particles can be fed as underflow of the separation unit, in a further advantageous embodiment, as crystal nuclei back to the collecting tank.

In an advantageous embodiment, a second substream is fed from the collecting tank to the heat exchanger. The second substream for this purpose is withdrawn from the second classifying region, advantageously at the bottom of the collecting tank, and contains, in particular, large sulfate particles. The second substream is then heated in the heat exchanger.

To achieve supersaturation of the scrubbing medium, the second substream, after it passes through the heat exchanger, is expediently recirculated to the collecting tank. Here, owing to the reduced pressure prevailing in the collecting tank of advantageously 100 mbar, the water is vaporized with heat removal at the boundary surfaces of the collecting tank. Owing to a takeoff of the water, or of the steam, supersaturation results, and the particles grow in the solution.

Further, a first substream of the overflow of the separation unit is fed to an additional crystallizer for recovery of the active component of the scrubbing medium. The overflow in this case is a low-particle clear run which, after solid-liquid separation has been completed, leaves the separation unit via the outlet thereof. By feeding the first substream into the additional crystallizer, in addition to the desired recovery of the active component of the scrubbing medium, in addition unwanted minor components and breakdown products are removed from the scrubbing medium and are fed as a waste stream to a reclamation.

Expediently, a second substream of the overflow of the separation unit is fed to the evaporator and is thereby available for ejection of water for concentrating the active component of the scrubbing medium. A third substream of the overflow of the separation unit, in a further advantageous embodiment, is fed to an absorber unit of a separation device.

When a heat exchanger is used, the feed of the first substream of the overflow advantageously likewise proceeds to an additional crystallizer for recovery of the active component of the scrubbing medium. Also, the feed of the third substream of the overflow to an absorber unit of a separation device is particularly advantageous. The feed of the second substream of the overflow of the separation unit proceeds advantageously into the collecting tank. For this purpose, the outlet of the separation unit is expediently connected to an inlet of the collecting tank.

Advantageously, an alkali metal concentration, in particular a potassium concentration, in the scrubbing medium is adjusted via a metering device connected to the collecting tank, as a result of which, according to requirements, the alkali metal concentration can be raised or lowered in the process.

Advantageously, a second substream that is enriched with sulfate particles having substantially large sulfate particles, in particular having substantially large potassium sulfate particles, is fed from the collecting tank to a reclamation appliance. For this purpose, for example a sump pump can be used which is suitable for transporting liquids having large solid fractions and takes off the second substream at the bottom of the collecting tank.

Expediently, an amino acid salt, in particular a potassium-containing amino acid salt, is used as active component of the scrubbing medium.

The advantages stated for the processing unit and for the separation device and the developments thereof can be applied accordingly to the advantageous implementations of the method.

BRIEF DESCRIPTION OF THE DRAWINGS

Hereinafter, exemplary embodiments of the invention are explained in more detail with reference to a drawing. In the drawings.

DETAILED DESCRIPTION OF INVENTION

Figure 1:
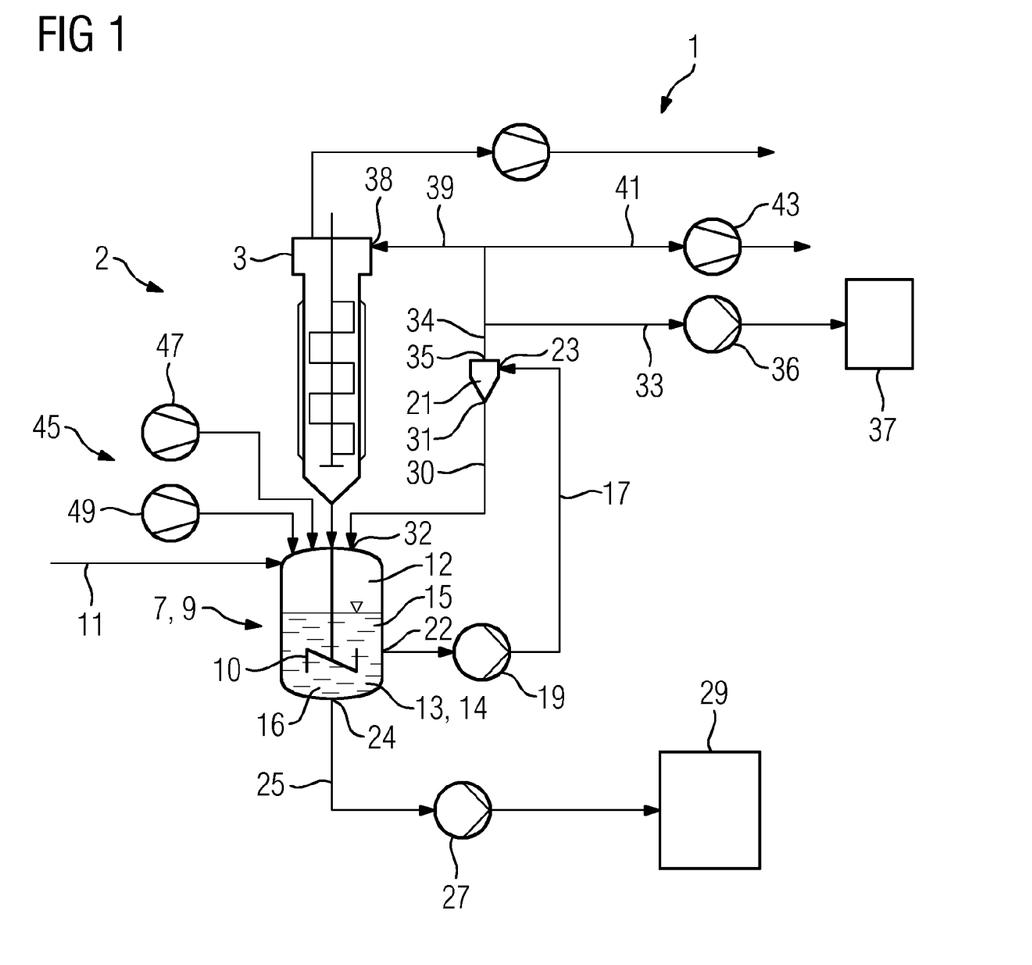
FIG. 1 shows a processing unit for a scrubbing medium contaminated with sulfur oxides and/or nitrogen oxides and having an evaporator and a collecting tank connected thereto, and also

In FIG. 1, a processing unit 1 for a scrubbing medium contaminated with sulfur oxides and/or nitrogen oxides is shown. The processing unit 1 comprises an evaporation stage 2 having an evaporator 3 constructed as a thin-film evaporator for concentrating contaminated scrubbing medium by concentrating the active component of the scrubbing medium, and also having a collecting tank 7 connected to the evaporator 3.

Such a collecting tank 7 is in principle used in the processing of scrubbing medium in an $NO_x$ reclaimer, in which it serves as receiver tank or as pump receiver for the scrubbing medium feedable to a crystallizer of the $NO_x$ reclaimer.

In contrast thereto, the collecting tank 7 of the processing unit 1 is constructed as a crystallizer 9 for removing sulfur oxides from the scrubbing medium by crystallization of potassium sulfate. The crystallizer 9 is dimensioned so as to be larger in comparison with collecting tanks used to date, and, optionally, but not obligatorily, equipped with an agitator 10.

The feed of the scrubbing medium in the collecting tank 7 constructed as a crystallizer 9 proceeds starting from a carbon dioxide separation device desorption unit, which is not shown. Starting from the desorption unit, a sulfate-rich input stream 11 having approximately 30% by weight of an amino acid salt used as active component of the scrubbing medium is conducted into the collecting tank 7 and there mixed with thickened scrubbing medium (approximately 60% by weight) of the amino acid salt from the evaporator 3. The input stream 11 has an entry temperature between 30° C. and 40° C., whereas the temperature in the collecting tank 7 is between 60° C. and 65° C. Despite the temperature rise, the solubility of the potassium sulfate decreases sharply within the scrubbing medium and the scrubbing medium becomes supersaturated.

Supersaturation of the scrubbing medium then decreases owing to the crystallization of potassium sulfate in the crystallizer 9. For this purpose, the crystallizer 9 is constructed having a crystallization chamber 12.

In addition, the crystallizer 9 comprises a classifying appliance 13 that permits separation according to their particle size of potassium sulfate particles that have crystallized out in the crystallization chamber 12. The classifying appliance 13 is constructed in the form of a classifying zone 14 having a first classifying region 15 and a second classifying region 16 within the crystallizer 9. In the first classifying region 15, substantially potassium sulfate particles of medium and small size collect, wherein, in the second classifying region 16, the large potassium sulfate particles collect. The collecting tank 7 and the evaporator 3 are therefore an evaporating crystallizer having an internal classifying function.

After the potassium sulfate particles have been separated according to the particle size thereof, a first substream 17 of the scrubbing medium is fed by means of a pump 19 from the collecting tank 7 to a separation unit 21 constructed as a hydrocyclone. For this purpose the first classifying region 15 is coupled via the outlet 22 of the collecting tank 7 to an inlet 23 of the separation unit 21. The first substream 17 substantially comprises the medium and small potassium sulfate particles that have been separated off from the heavy particles in the classifying zone 15 of the crystallizer 9.

In addition, via an outlet 24 of the collecting tank 7, a second substream 25 enriched with potassium sulfate particles is fed from the second classifying region 16 by means of a pump 27 constructed as a sump pump from the collecting tank 7 to a reclamation appliance 29. The suspension ejected in this case, that is to say second substream 25, has a potassium sulfate fraction between 3% by weight and 10% by weight, wherein the solids fraction can be adjusted via the discharge rate of the sump pump 27.

In the separation unit 21, the medium and small particles of potassium sulfate present in the first substream 17 are separated off from the scrubbing medium. The underflow 30 which is formed in solid-liquid separation contains the potassium sulfate particles separated off from the scrubbing medium which are then fed back to the crystallization process as crystal nuclei via a coupling of the outlet 31 of the separation unit 21 to an inlet 32 of the collecting tank 7.

A first substream 33 of the overflow 34 formed in this solid-liquid separation, that is to say low-particle clear run, is then fed by means of a pump 36 to an additional crystallizer 37 for recovery of the active component of the scrubbing medium. The crystallizer 37 is constructed as a crystallizer for the $NO_x$ reclaiming process.

In addition, the separation unit 21 is coupled to the evaporator 3. The coupling proceeds via the outlet 35 of the separation unit to an inlet 38 of the evaporator 3. A second substream 39 of the overflow 34, the main stream, can in this manner be recirculated to the evaporator 3 and there, for the purpose of concentrating the active component of the scrubbing medium, can eject water therefrom.

Figure 3:
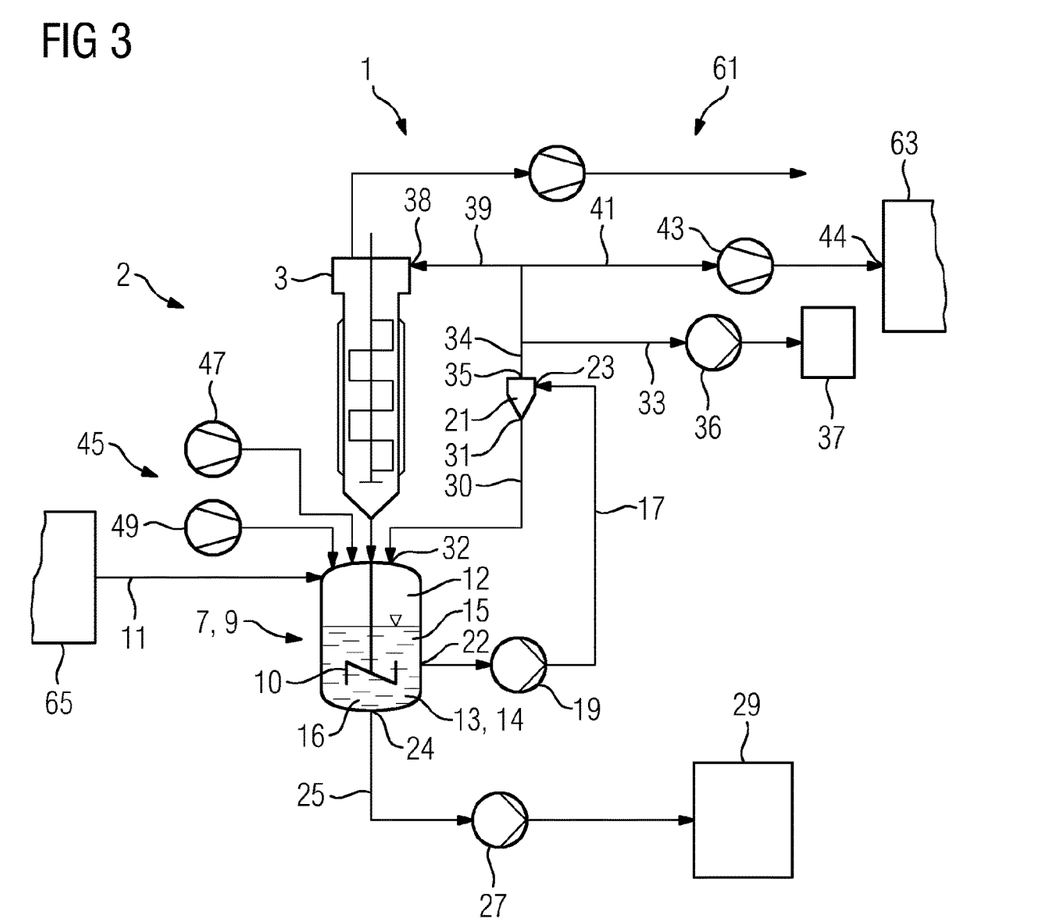
FIG. 3 shows a carbon dioxide separation device having a processing unit according to FIG. 1.

A third substream 41 of the overflow 34 of the separation unit 21 is fed by means of a pump 43 to an absorber unit which is not shown of a carbon dioxide separation device. For this purpose, the outlet 35 of the separation unit 21 is coupled to the inlet 44 of the absorber unit, which is shown in FIG. 3. Such a recirculation is suggested when, for the ejection of the potassium sulfate, more scrubbing medium must be treated than would be economically necessary for the regeneration of the scrubbing medium associated with losses of the scrubbing medium.

To adjust the potassium concentration in the scrubbing medium, a metering device 45 is connected to the collecting tank 7 constructed as crystallizer 9. The metering device 45 comprises two pumps 47, 49, by means of which additional reactants can be fed to the system, in order in this manner to prevent an unwanted concentration of potassium, for example in gas-fueled power plant applications, or alternatively an unwanted depletion of potassium, for example in coal-fired power plant applications.

Figure 2:
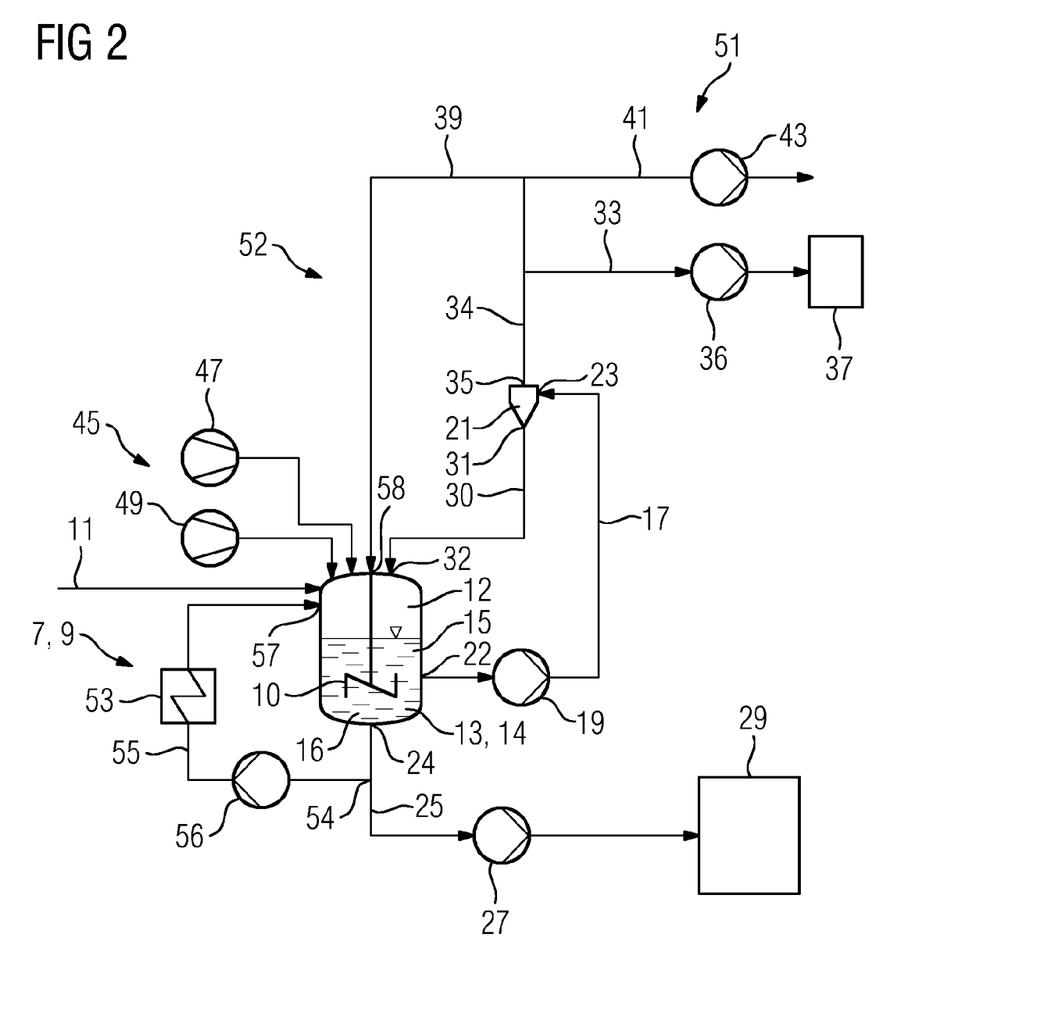
FIG. 2 shows a carbon dioxide separation device having a processing unit according to FIG. 1.

In FIG. 2, a further processing unit 51 for a scrubbing medium contaminated with sulfur oxides and/or nitrogen oxides may be seen illustrated. The processing unit 51 comprises an evaporation stage 52 having a heat exchanger 53, and also a collecting tank 7 connected to the heat exchanger 53. This combination of heat exchanger 53 and collecting tank 7 is known as a forced circulation (FC) crystallizer.

In contrast to the evaporation stage 2 according to FIG. 1, in the present case a second substream 55 is withdrawn from the collecting tank 7 via a second outlet 54. The second substream 55 is fed to the heat exchanger 53 by means of a pump 56. In the heat exchanger 53, the second substream 55 passes through heating tubes and is correspondingly heated. After passage through the heat exchanger 53, the heated second substream 55 is fed to the collecting tank 7 via an inlet 57 thereof.

In the collecting tank 7, a reduced pressure of about 100 mbar prevails, as a result of which water evaporates with heat removal at the boundary surfaces of the collecting tank 7. Via a takeoff of the water, or of the steam, supersaturation results, and the particles grow in the scrubbing medium.

Since the processing unit 51, or the evaporation stage 52, in contrast to the processing unit 1 according to FIG. 1, comprises the heat exchanger 53 instead of an evaporator, the second substream 39 withdrawn from the outlet 35 of the separation unit 21 is fed to the overflow 34 of the collecting tank 7. For this purpose, the outlet 35 of the separation unit 21 is connected to an inlet 58 of the collecting tank 7.

With respect to the description of the function of the further components of the processing unit 51, at this point, reference is made to the detailed description of the processing unit 1 according to FIG. 1.

In FIG. 3, a carbon dioxide separation device 61 having a processing unit 1 according to FIG. 1 is shown. The separation device 61 comprises an absorber unit 63 and a desorber unit 65 that is flow-coupled thereto. The processing unit 1 is flow-connected downstream of the processing unit.

In the absorber unit 63 a flue gas stream is contacted with the scrubbing medium, a potassium-containing amino acid salt, and the carbon dioxide present in the scrubbing medium is absorbed in the scrubbing medium. At the same time, sulfur oxides and nitrogen oxides present in the flue gas are co-introduced into absorber unit 63 and absorbed in the scrubbing medium. The loaded scrubbing medium is then, via heat exchangers that are not shown, conducted into the desorber unit 65, where the absorbed carbon dioxide is removed from the scrubbing medium by thermal desorbtion.

The nitrogen oxides ($NO_x$) and sulfur oxides ($SO_x$) remaining in the scrubbing medium are then removed from the scrubbing medium in the processing unit 1 flow-connected downstream in the desorber unit 65 and said scrubbing medium is correspondingly regenerated for renewed use in the course of the absorption-desoption process. For this purpose, the scrubbing medium is introduced as input stream 11 in the collecting tank 7 of the processing unit 1. The corresponding processing of the scrubbing medium is described in detail in FIG. 1, to which reference is made at this point.

Of course, the processing unit 51 shown in FIG. 2 can also be used in a separation device 61.

The invention claimed is:

1. A processing unit for a liquid scrubbing medium contaminated with sulphur oxides and/or nitrogen oxides, comprising an evaporation stage for concentrating an active component of the scrubbing medium comprising an evaporator and/or a heat exchanger, and a collecting tank that is connected to the evaporator and/or to the heat exchanger, wherein the collecting tank is connected via a first outlet of the collecting tank to a separation unit, wherein the collecting tank is constructed as a crystallizer for removing sulphur oxides from the scrubbing medium by crystallization of a sulphate, wherein a first outlet of the separation unit is connected to an additional crystallizer for recovery of the active component of the scrubbing medium, wherein a second outlet of the separation unit is connected to a first inlet of the collecting tank, and wherein the first outlet of the separation unit is connected to an inlet of the evaporator.

2. The processing unit as claimed in claim 1, wherein the separation unit is constructed as a hydro cyclone.

3. The processing unit as claimed in claim 1, wherein the collecting tank comprises a classifying appliance for separating the crystallized sulphate particles according to a particle size thereof.

4. The processing unit as claimed in claim 3, wherein the classifying appliance is constructed in the form of a classifying zone comprising a first classifying region and a second classifying region within the crystallizer, wherein the first classifying region is connected via the first outlet of the collecting tank to an inlet of the separation unit.

5. The processing unit as claimed in claim 1, wherein the first outlet of the separation unit is connected to an inlet of an absorber unit of a carbon dioxide separation device.

6. The processing unit as claimed in claim 1, further comprising
a metering device for adjusting an alkali metal concentration in the scrubbing medium, which metering device is connected to the collecting tank.

7. The processing unit as claimed in claim 4, wherein the second classifying region is connected via a second outlet of the collecting tank to a reclamation appliance for the crystallized sulphate particles.

8. The processing unit as claimed in claim 1, wherein an amino acid salt is used as the active component of the scrubbing medium.

9. The processing unit as claimed in claim 1, further comprising:
an absorber unit for separating off carbon dioxide from a flue gas by means of a scrubbing medium, and also a desorber unit that is flow-connected downstream of the absorber unit and is for separating off the carbon dioxide from the scrubbing medium, and
wherein the collecting tank is flow-connected downstream of the desorber unit.

10. A method for processing a scrubbing medium contaminated with sulphur oxides and/or nitrogen oxides, the method comprising:
feeding the scrubbing medium, to concentrate an active component thereof, to an evaporation stage comprising an evaporator and/or a heat exchanger, and
a collecting tank that is flow-connected to the evaporator and/or to the heat exchanger, wherein sulphur oxides present in the scrubbing medium are crystallized out in the collecting tank as sulfate particles that are fed to a separation unit from the collecting tank, feeding a first substream of an overflow of the separation unit to an additional crystallizer for recovery of the active component of the scrubbing medium, and feeding a second sub stream of an overflow of the separation unit to the collecting tank, and feeding a second sub stream of an overflow of the separation unit to the evaporator.

11. The method as claimed in claim 10, further comprising:
separating sulphate particles in a classifying appliance of the collecting tank according to their particle size.

12. The method as claimed in claim 10,
feeding a third sub stream of an overflow of the separation unit to an absorber unit of a separation device.

13. The method as claimed in claim 10, further comprising:
adjusting an alkali metal concentration in the scrubbing medium via a metering device connected to the collecting tank.

14. The method as claimed in claim 10, further comprising:
feeding a second sub stream that is enriched with sulphate particles comprising substantially large sulphate particles from the collecting tank to a reclamation appliance.

15. The method as claimed in claim 10,
wherein an amino acid salt is used as the active component of the scrubbing medium.

16. The processing unit as claimed in claim 1,
wherein the sulphate comprises potassium sulphate.

17. The processing unit as claimed in claim 6,
wherein the alkali metal concentration comprises a potassium concentration.

18. The processing unit as claimed in claim 7,
wherein the crystallized sulphate particles comprises potassium sulphate.

19. The processing unit as claimed in claim 8,
wherein the amino acid salt comprises a potassium-containing amino acid salt.

20. The method as claimed in claim 10,
wherein the sulfate particles comprise potassium sulphate particles.

21. The method as claimed in claim 11, further comprising:
feeding a first substream comprising substantially small and medium sulphate particles from the collecting tank to the separation unit.

22. The method as claimed in claim 21,
wherein the substantially small and medium sulphate particles comprise substantially small and medium potassium sulphate particles.

23. The method as claimed in claim 13,
wherein the alkali metal concentration comprises a potassium concentration.

24. The method as claimed in claim 15,
wherein the amino acid salt comprises a potassium-containing amino acid salt.

25. The processing unit as claimed in claim 6, wherein the metering device comprises two pumps by means of which additional reactants are fed to the collecting tank to prevent an unwanted concentration of potassium.

26. The processing unit as claimed in claim 7, wherein the reclamation appliance comprises a collection tank and a solid-liquid separator comprising a filter, decanter, or centrifuge.

27. The processing unit as claimed in claim 9, wherein the absorber unit comprises a scrubber and the desorber unit comprises a thermal desorber comprising a desorber heat exchanger.

* * * * *